(12) United States Patent
Fang et al.

(10) Patent No.: US 7,324,613 B2
(45) Date of Patent: Jan. 29, 2008

(54) MULTI-LAYER DIFFERENTIAL PHASE SHIFT KEYING WITH BIT-INTERLEAVED CODED MODULATION AND OFDM

(75) Inventors: Yuguang Fang, Gainesville, FL (US); Byung-Seo Kim, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 856 days.

(21) Appl. No.: 10/721,533

(22) Filed: Nov. 25, 2003

(65) Prior Publication Data

US 2005/0111590 A1    May 26, 2005

(51) Int. Cl.
*H03D 3/22* (2006.01)
*H04K 1/10* (2006.01)

(52) U.S. Cl. ............................ 375/330; 375/260

(58) Field of Classification Search ............... 375/330, 375/308, 329, 260; 329/304; 370/208
See application file for complete search history.

(56) References Cited

U.S. PATENT DOCUMENTS

2004/0264585 A1*  12/2004  Borran et al. ............... 375/260
2006/0239177 A1*  10/2006  Mazet et al. ................ 370/208

OTHER PUBLICATIONS

Esmailian et al., "A Discrete Multitone Power Line Communications System," IEEE International Conference on Acoustics, Speech, and Signal Processing 2000, 5:2953-2956, Jun. 5-9, 2000.
Liu et al., "Wide Band AC Power Line Characterization," IEEE Transactions on Consumer Electronics, pp. 1087-1097, Nov. 1999.
Rohling et al., "High-Rate OFDM-modem with Quasi-Coherent DAPSK," 1997 IEEE 47th Vehicular Technology Conference, 2055-2059, May 1997.
Fischer et al., "Coded Modulation for Noncoherent Reception with Application to OFDM," IEEE Transactions on Vehicular Technology, 50:910-919, Jul. 2001.
Caire et al., "Bit-Interleaved Coded Modulation," IEEE Transactions on Information Theory, 44:927-946, May 1998.

* cited by examiner

*Primary Examiner*—Khai Tran
(74) *Attorney, Agent, or Firm*—Akerman Senterfitt

(57) ABSTRACT

An efficient system and method for modulation and demodulation to achieve a high data rate using Bit-Interleaved Coded Modulation and OFDM uses either a coherent or a non-coherent transmission scheme using differential modulation. In order to maintain a high data rate impervious to sudden phase changes, a communication system uses an efficient constellation having multiple rings with different sizes and modulation/demodulation schemes utilizing this constellation. In power line communications, the channel gain information is obtained easily at a receiver (100) while the phase information is not. Thus, the communication system uses an absolute magnitude and differential phase coding for modulation and demodulation of the signals.

18 Claims, 15 Drawing Sheets

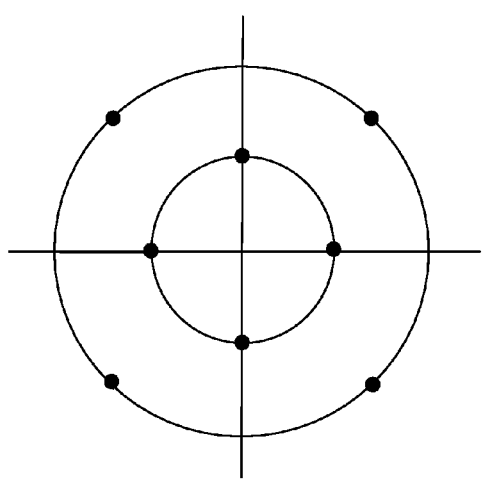
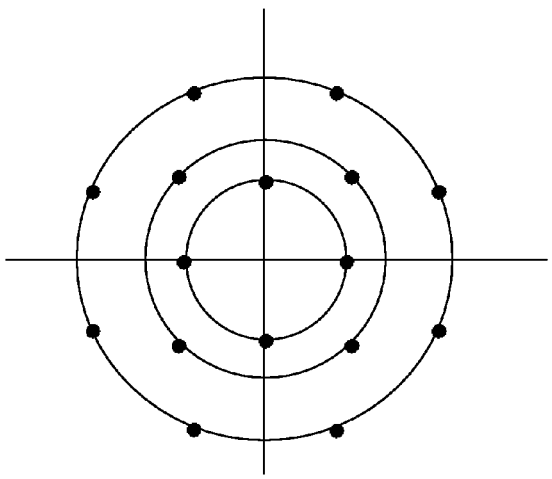
FIG. 5a
FIG. 5b
PRIOR ART
PRIOR ART
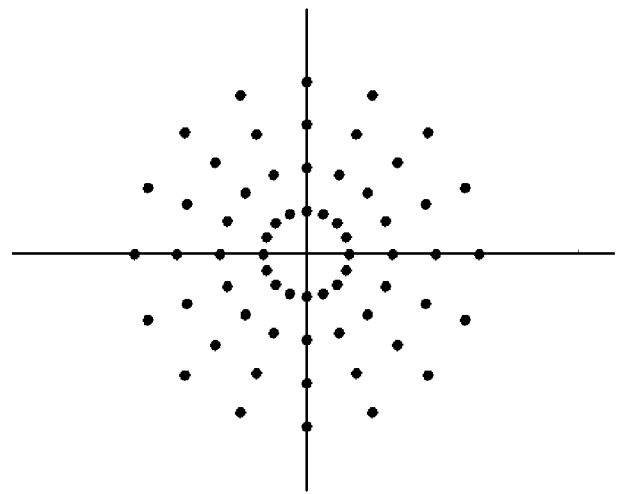
FIG. 6
PRIOR ART

MULTI-LAYER DIFFERENTIAL PHASE SHIFT KEYING WITH BIT-INTERLEAVED CODED MODULATION AND OFDM

FIELD OF THE INVENTION

This invention is related to a semi-non-coherent communication system over wireless or wired channel which may be subject to a sudden phase change like power line communication.

BACKGROUND OF THE INVENTION

When a data bit sequence comes to a modulator, it is grouped with a certain number of bits and each group is mapped to one of the points on the constellation as shown in FIG. 1. A point on the constellation is called a symbol and a symbol is a complex number that has phase and magnitude information. FIG. 2 shows one constellation which has eight symbols with one magnitude that is a set distance between the point and the origin. Referring to FIG. 2, each symbol consists of three bits with a different bit sequence. The integer number of each point is a decimal number representing the bit sequence. The gray code is used to assign the bit sequence so that the bit difference between two closest points is always one. The symbols are transmitted over the channel and the position of that received symbol may be changed due to the noise.

When the signal is received at the receiver, the receiver is trying to find out which point on the constellation is the closest to the received signal. This is the demodulation process. The closest one is considered the transmitted one at the receiver. This process is explained in another way using the region. Each point on the constellation has its own region as shown FIG. 3. If the received symbol is fallen in one of regions, the point of that region is considered as the transmitted symbol. Referring to FIG. 3, RX is the received symbol. The closest point on the constellation is 0 and RX has fallen in the region of 0. Therefore, the demodulated signal is 0.

In differential modulation, the symbol is not transmitted with the phase that the point has. FIG. 4 explains a differential modulation process. Referring to FIG. 4, "A" is a mapped current point with incoming bit sequence that will be modulated and R is a differentially modulated symbol with a previous symbol. The phase of A, P2, is added with the phase of R, P1. TX is the modulated A with the added phase, P1+P2 and is transmitted. There is no magnitude change of A while there is phase change. At the receiver, the phase of the received symbol is subtracted by the phase of the previous received one. This is called a differential phase shift keying. Using this scheme the received signal is demodulated at the receiver without knowing the information of the phase change distorted by the noise at the receiver as well as the one of the magnitude distortion. In coherent system, the information of phase shift and channel gain is estimated by a channel estimation process, which makes the system complicated.

The constellation for the conventional Differential Phase Shift Keying (DPSK) has one magnitude and different phase changes. Referring to FIG. 5a to 5b, all points are placed on one ring with the same phase difference between two consecutive points. The performance of this modulation is degraded for constellations with more than 16 points because the signal points are located very closely on one circle. The distance between two consecutive points in FIG. 5b is closer than one in FIG. 5a.

In order to overcome the deficiency of DPSK, there are different modulation and demodulation for a differential encoding. FIG. 6 shows the constellation and the modulation process of a Differential Amplitude Phase Shift Keying (DAPSK). In this scheme, the magnitude and the phase of the symbol is encoded differentially. However, the constellation of this scheme is not efficient for the symbols positioned in the inner ring since the symbols are too close in such rings.

BRIEF SUMMARY OF THE INVENTION

An embodiment of the present invention provides an efficient constellation and signal processing method and design for modulation and demodulation using such constellation in order to achieve a high data rate as well as to use a differential encoding scheme under the channel when it is hard to find the phase distortion information (such as when power lines are used for the communication channel). In order to achieve such efficiency, the scheme can use the different absolute magnitude and differentially encoded phase.

While the art of differential modulation has drawbacks as mentioned previously, it is a good scheme in sudden phase changed channel environments. The problems are caused since all points in a constellation are getting closer as the number of points is increased. In order to overcome this problem, an embodiment in accordance with the invention uses the constellation which has multiple rings with different sizes. A different number of sample points are positioned on different rings and the phase differences between two consecutive points on a same ring are same. The first point on each ring has a different phase offset. Since this structure makes all points apart from one another and further than the conventional constellation for differential modulation, it can achieve reliable and high data rate transmission.

In addition, this constellation can be used in both systems, coherent and non-coherent systems. However, in order to achieve the high data rate under a sudden phase shifted channel, an embodiment of the invention provides the semi-non-coherent scheme as follows.

Using this constellation, at the transmitter, the incoming bit sequence is mapped to one of the points on the constellation. In the next step, the phase is differentially encoded with the previous encoded symbol, but the amplitude is not. The reason not to encode the magnitude differentially is that even if no channel state information is available at the receiver, the amplitude of the received signal can still provide information on the transmitted amplitude and the channel gain estimation is easier than the phase estimation. At the receiver, the magnitude of a currently received symbol is recovered through estimated channel gain and the phase is differentially decoded with the previously received symbol.

This scheme is named herein as Multi Layer Differential Phase Shift Keying (MLDPSK), which can be a semi-non-coherent communication system since both coherent and non-coherent systems are used.

Another way to achieve a high data rate transmission is to use Orthogonal Frequency division Multiplexing (OFDM) since multiple symbols can be transmitted at the same time. In addition, different bit allocation on each sub-carrier based on the sub-carrier condition achieves more reliable transmission instead of the same bit allocation on all sub-carriers. However, the drawback in the art of OFDM is caused by the impulse noise which produces the bursts of errors and in particular exists in power lines. In order to compensate for this, Bit-Interleaved Coded Modulation (BICM) is used to achieve more reliable transmission under impulse noise.

Additional features in accordance with the invention will be presented with respect to the following description and claims.

DETAILED DESCRIPTION OF THE DRAWINGS

FIG. 5a shows a constellation with 8 points for differential phase shift keying;

FIG. 5b shows a constellation with 16 points for differential phase shift keying;

FIG. 6 shows the constellation for DAPSK;

DETAILED DESCRIPTION OF THE INVENTION

Figure 1:
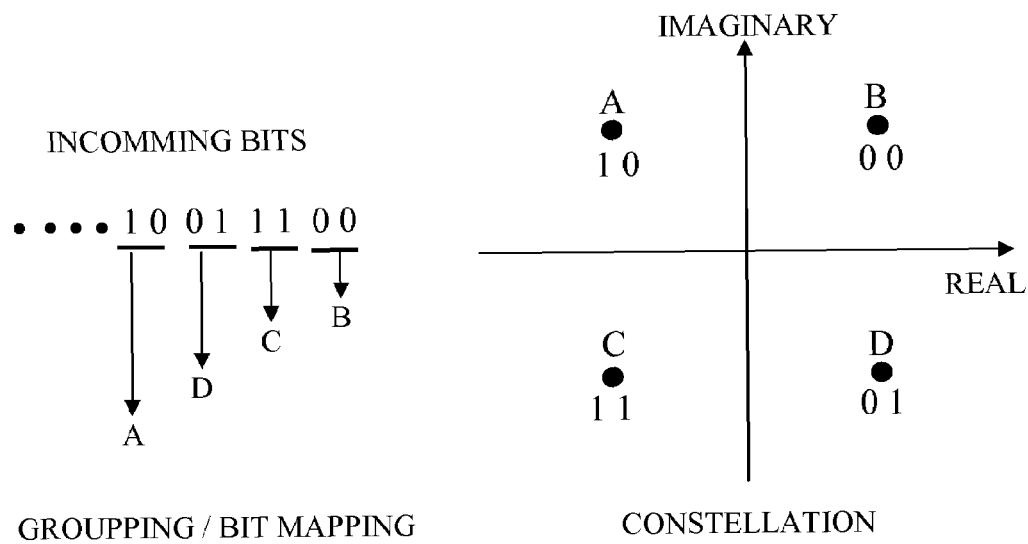
FIG. 1 shows an example of bit-mapping process.
Figure 2:
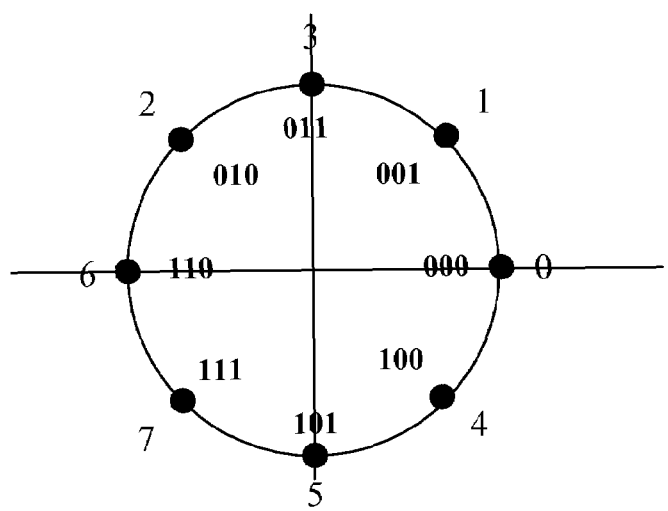
FIG. 2 is an example of constellation of 8-ary DBPSK.
Figure 3:
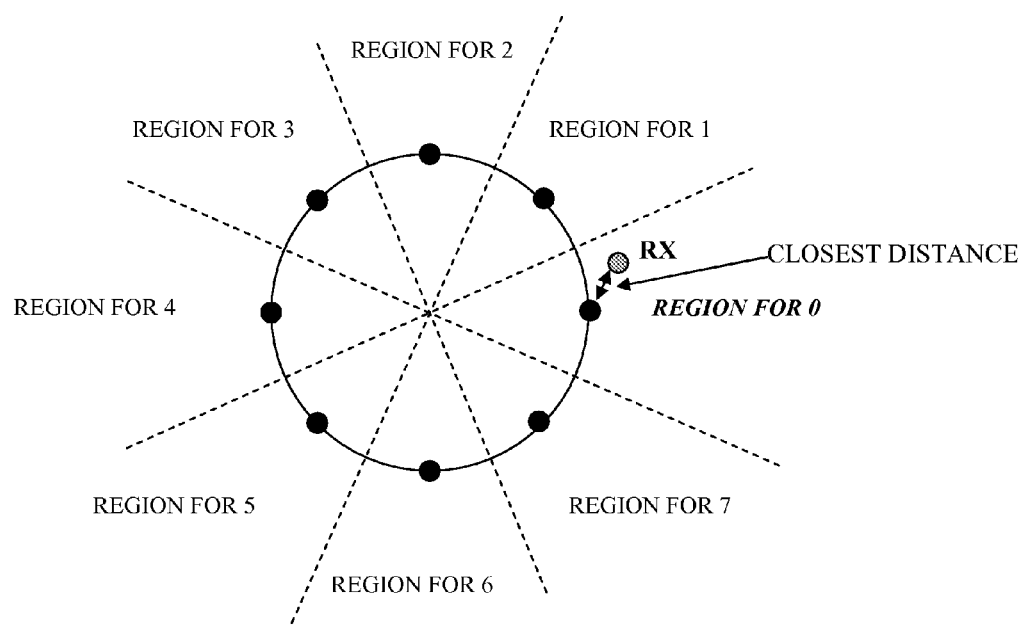
FIG. 3 shows an example of demodulation and region of each symbol with constellation of 8-ary DPSK.
Figure 4:
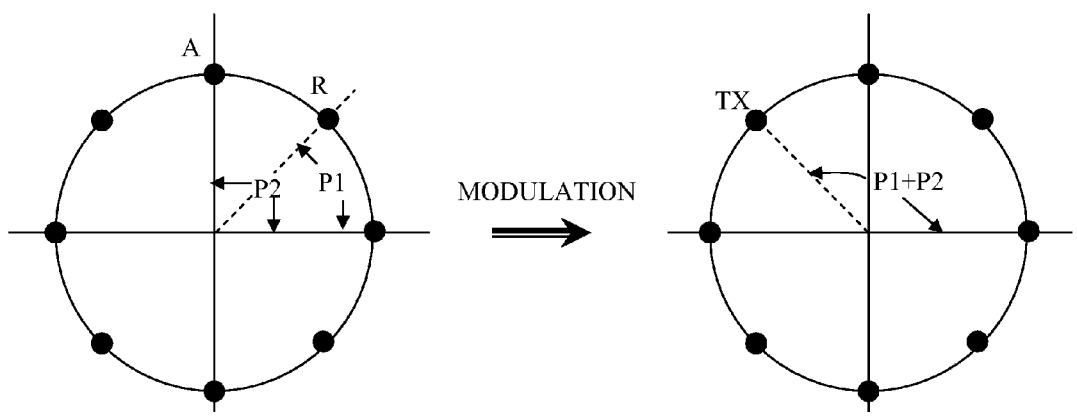
FIG. 4 illustrates an example of a process of differential phase shift keying modulation.
Figure 7A:
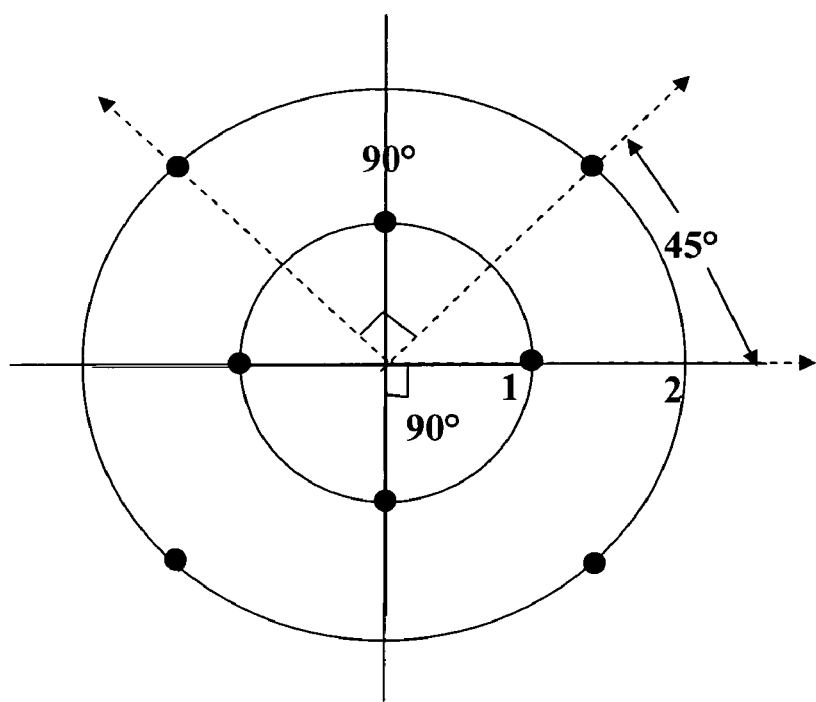
FIG. 7a is a constellation structure for 8-ary MLDPSK in accordance with the present invention.
Figure 7B:
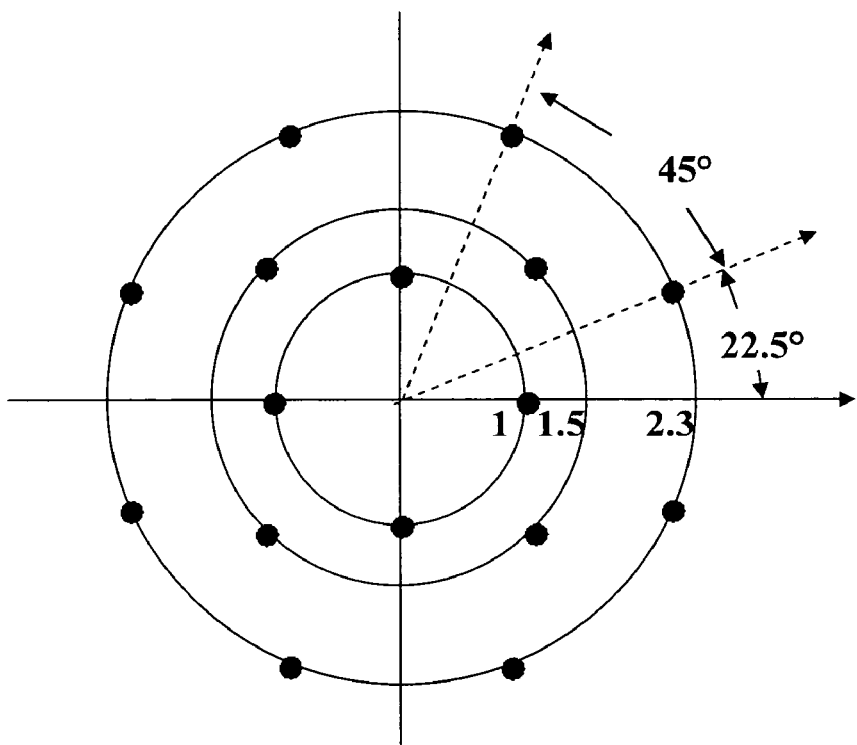
FIG. 7b is a constellation structure for 16-ary MLDPSK in accordance with the present invention.
Figure 7C:
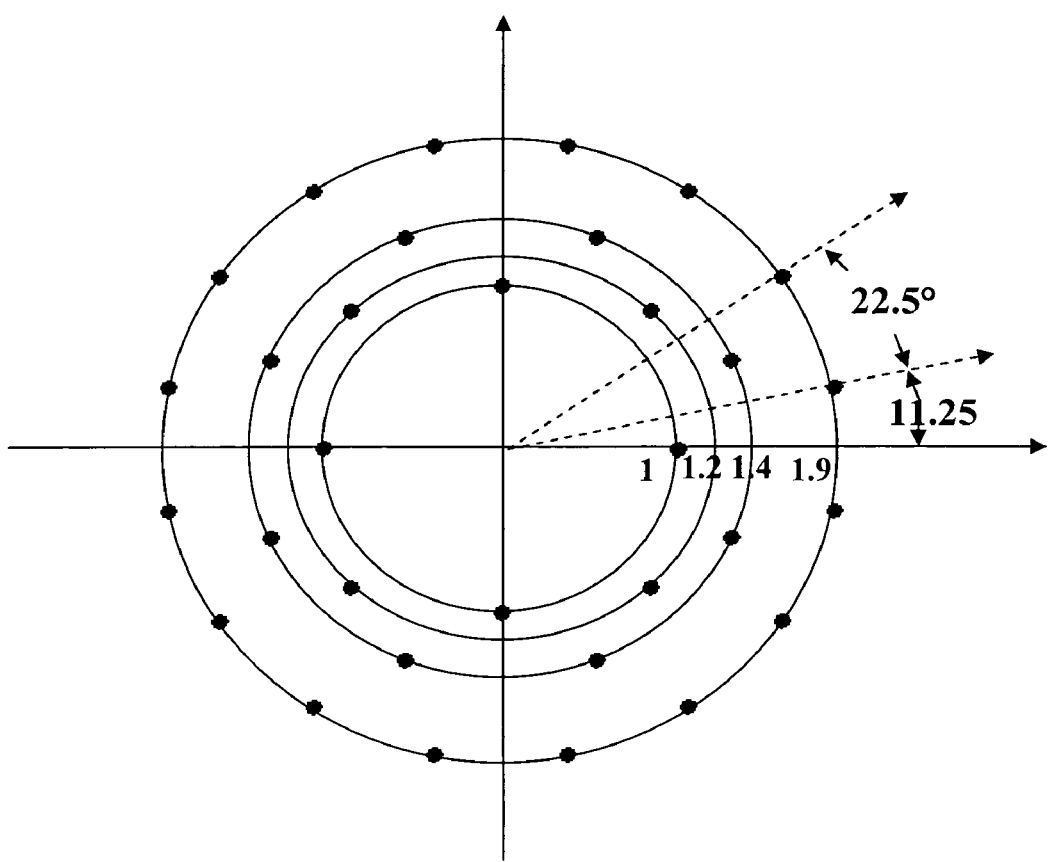
FIG. 7c is a constellation structure for 32-ary MLDPSK in accordance with the present invention.
Figure 7D:
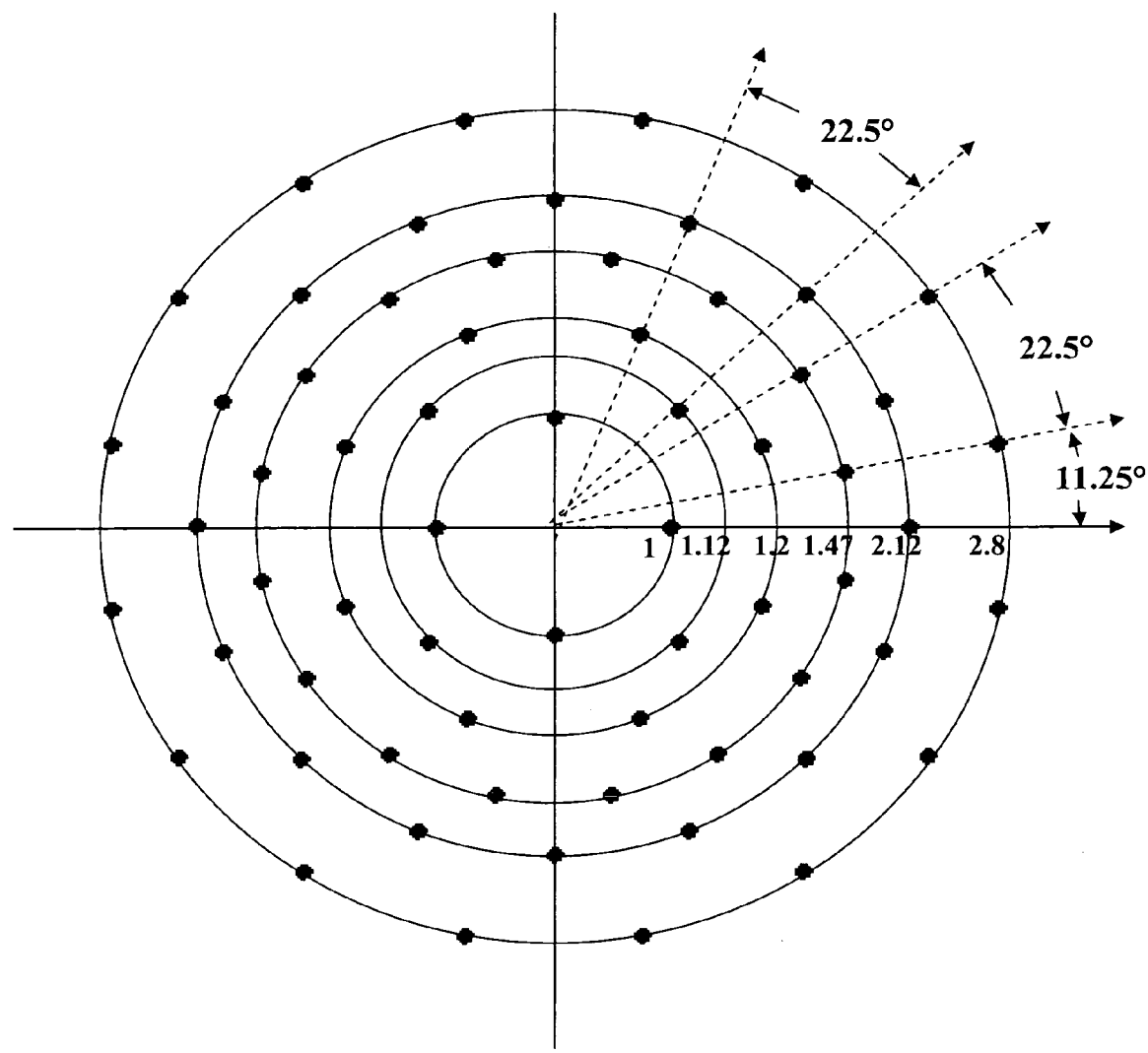
FIG. 7d is a constellation structure for 64-ary MLDPSK in accordance with the present invention.
Figure 8A:
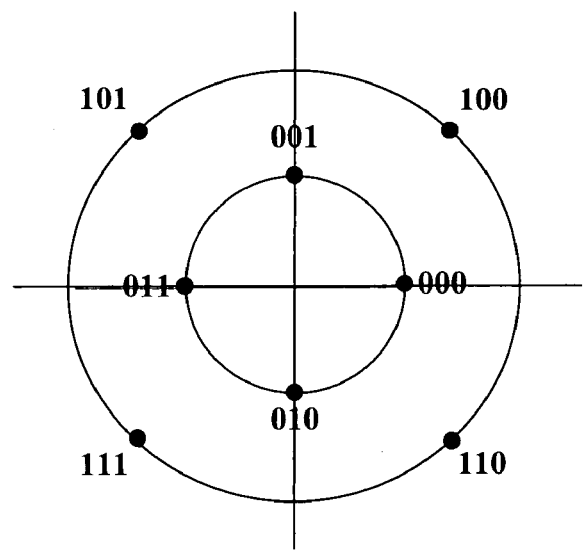
FIG. 8a shows the assignments of bit sequences for 8-ary MLDPSK in accordance with the present invention.
Figure 8B:
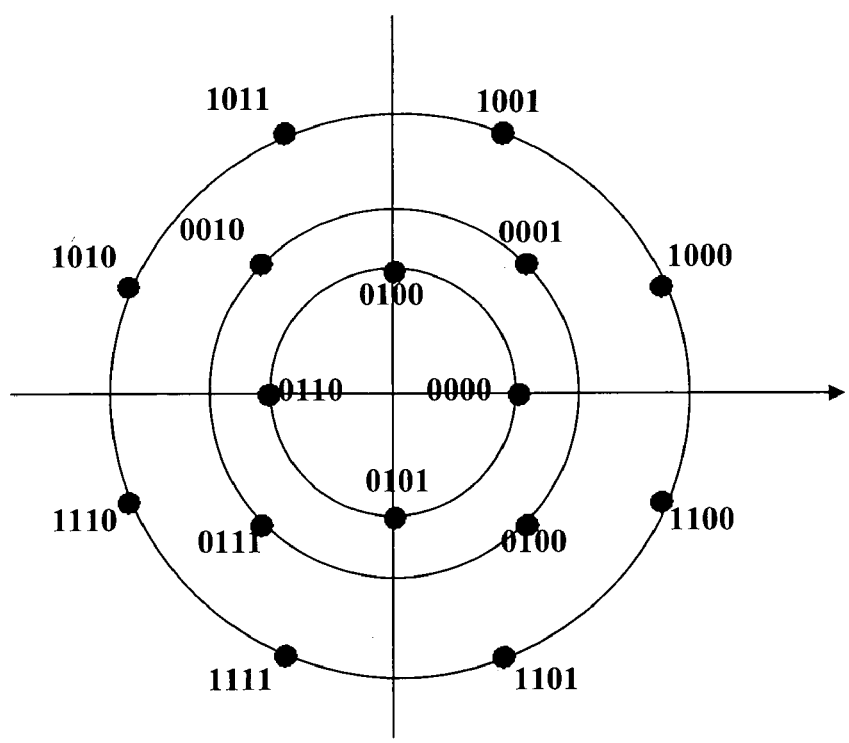
FIG. 8b shows the assignments of bit sequences for 16-ary MLDPSK.
Figure 8C:
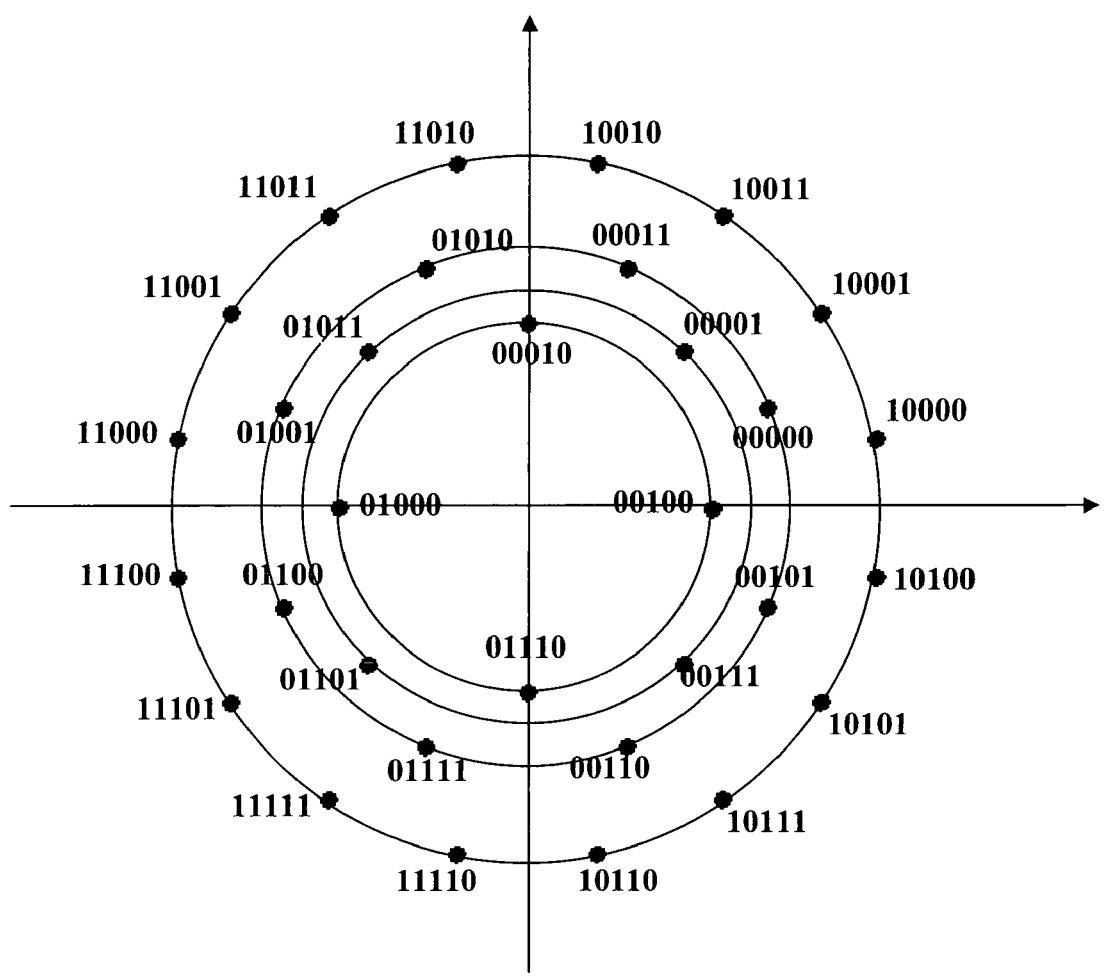
FIG. 8c shows the assignments of bit sequences for 32-ary MLDPSK in accordance with the present invention.
Figure 8D:
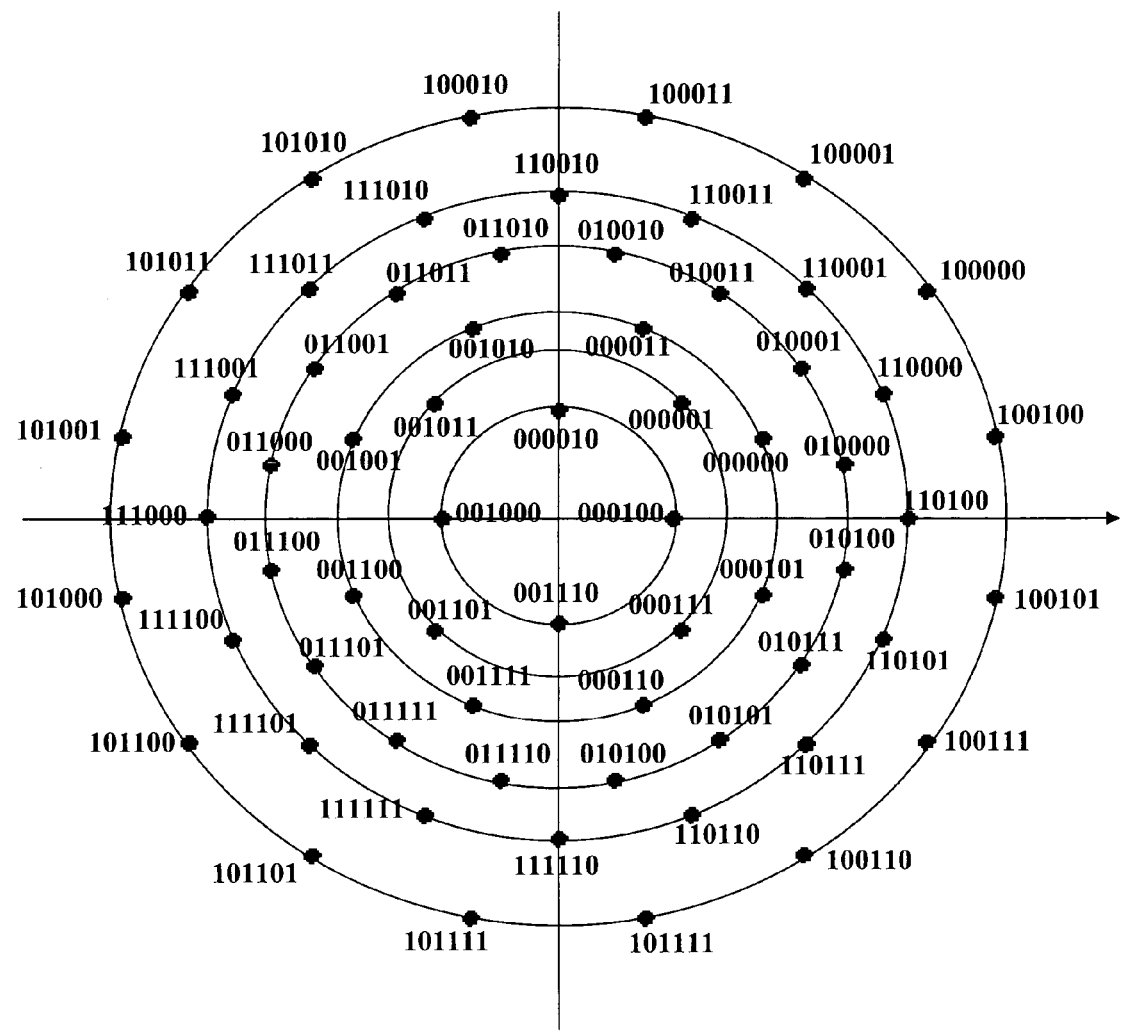
FIG. 8d shows the assignments of bit sequences for 64-ary MLDPSK in accordance with the present invention.

In general, a communication channel makes a transmitted signal distorted due to noise. The distortions of a signal are represented in the forms of phase shift and magnitude change. Therefore, complicated schemes are used to find how much the phase is shifted and how much the magnitude is changed while the signal is transmitting through the channel. With the phase shift and magnitude information, the receiver can decide what signal was originally transmitted from the transmitter. It is more difficult to determine phase shift change than the magnitude change. In addition, some communication channels have the characteristic of a sudden phase shift, which makes it harder to estimate symbols in a channel to demodulate the signal. A power line as the communication channel has such characteristics since the impedance change by using a switch like a TRIAC causes the phase change suddenly.

There are two kinds of communication systems. One is a coherent system that needs information of changes of phase and magnitude. The other is a non-coherent system that does not need any information of the transmitted signal. For the communication channel with sudden phase shift, a non-coherent system is preferred. However, it is hard to achieve a high data rate transmission since the conventional constellation is not efficient as the points are increased. Therefore, an embodiment of the invention provides an efficient constellation and modulation/demodulation scheme.

At first, the constellation is described in the following.

The constellation provides different types of constellations according to how many point are needed. The constellations for 8, 16, 32 and 64 points (point means same as symbol) are shown.

The embodiments of the presented invention will be described in detailed with reference to FIG. 7a to 8d.

First Aspect

An embodiment can have multiple rings as shown in FIGS. 7a to 7d. There are different numbers of rings according to the number of symbol points, two rings for 8 points, three for 16, four for 32 and six for 64.

Second Aspect

Each ring has a fixed number of symbols, namely, 4 symbols for the first and the second rings, 8 symbols for the third ring and 16 symbols for the forth, fifth and sixth rings.

Third Aspect

The phase difference between two consecutive symbols on the same ring is the same and fixed, 90 degrees for the first and second rings, 45 degrees for the third ring and 22.5 degrees for the rest of rings. In addition, the phase offset of the first point on each ring is 0 degree for the first and the fifth rings, 45 degrees for the second, 22.5 degrees for the third ring and 11.25 degrees for the forth and sixth rings.

Fourth Aspect

The radius of each ring is different on each constellation. However, the radius of the first ring is always the same as one (magnitude). In an 8 point constellation, the radius of the second ring is 2. In a 16 point constellation, the second is 1.5 and the third is 2.3. In a 32 point constellation, the second is 1.2, the third is 1.4, and the forth is 1.9. In a 64 point constellation, the second is 1.12, the third is 1.2, the forth is 1.47, the fifth is 2.12 and the sixth is 2.8.

Fifth Aspect

As mentioned above, the group of bits is mapped to one of the points on the constellation. FIG. 8a to 8d show the bit mapping of each point on the constellation. The bit mapping is different based on the number of points. The rule of the assignment of the bit sequence is that there is one bit difference between two closest points. If there are two bits that have same closest distance to one point, one point can have one bit difference and the other can have a two bit difference.

The mapped symbols are transmitted through the channel in the environment without any specific modulation/demodulation scheme. When the symbols are received at the receiver, the symbols are distorted by noise and fading. The receiver calculates the distances between the received symbol and all points on the constellation and considers the closest one as the transmitted symbol. In other words, each point on the constellation has its own region so that if the demodulated symbol has fallen in one of the regions, the point whose region that symbol is fallen in is considered as the transmitted symbol. Therefore, one aspect of the invention is to expand the region of each point on the constellation.

Secondly, the modulation and demodulation scheme using the constellation herein, which is named MLDPSK, is explained in the following.

The modulation/demodulation herein provides a semi-non-coherent system since the receiver does not need to know the phase shift information as in a non-coherent system while the magnitude distortion should be estimated as in a coherent system. In other words, an embodiment of the invention uses differential encoding for phase from a non-coherent system and the magnitude estimation from a coherent system.

The incoming bit sequence is grouped and mapped to one of the points on the constellation. The mapped point is called a symbol and each symbol is represented with magnitude and exponential number which has phase information. The numerical expression of one of the symbols is $$Symbol = Ae^{j\alpha}$$

where A is a magnitude which is the distance from the origin to the symbol and $\alpha$ is the phase.

Figure 9:
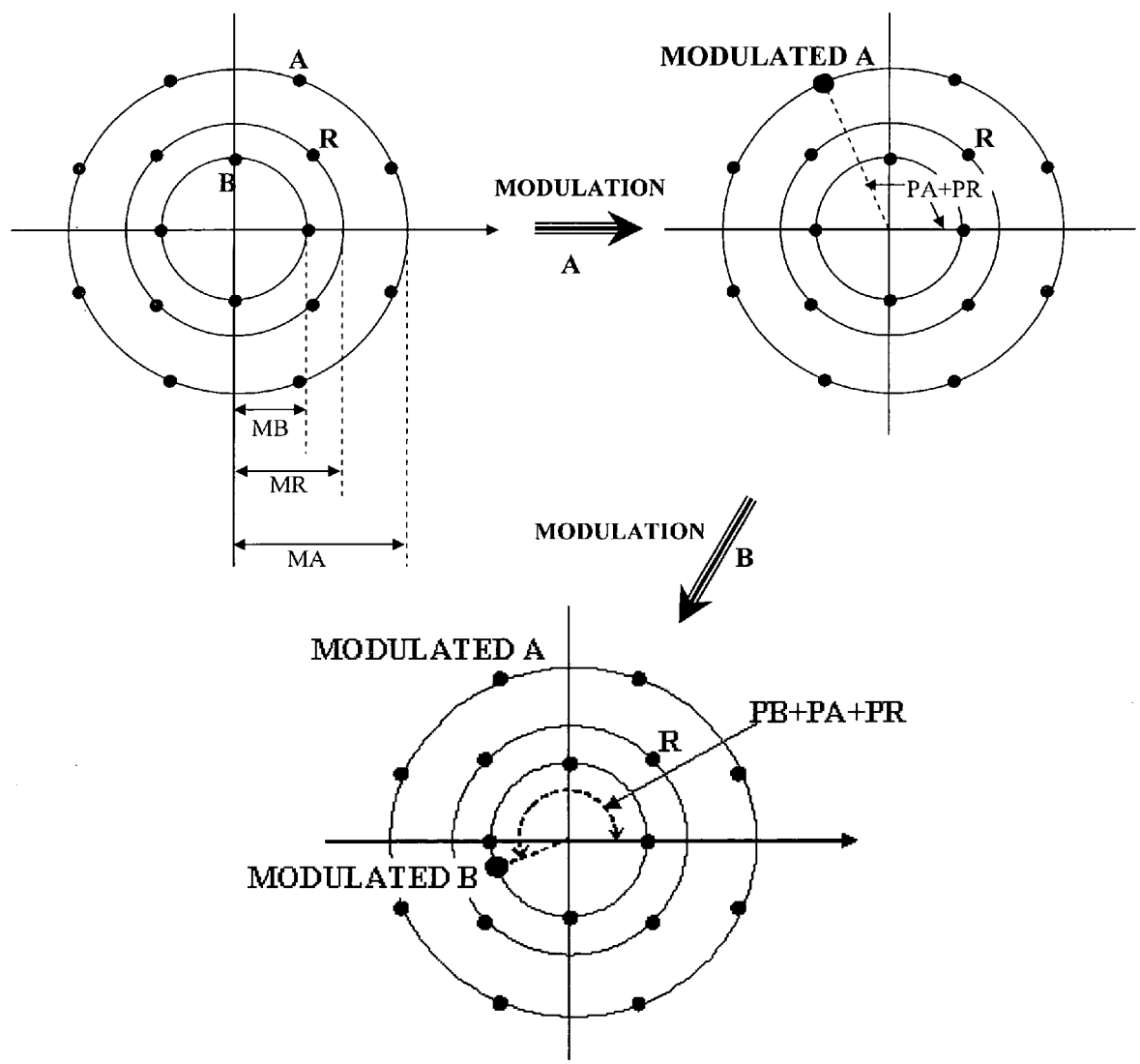
FIG. 9 illustrates the modulation process for 16-ary MLDPSK in accordance with the present invention.

FIG. 9 explains the process for the modulation of the invention with 16-ary MLDPSK. There are two symbols, A and B, and one reference symbol, R, that provides the reference phase for the differential encode. All three symbols have their own magnitudes, Mr, Ma and Mb, and phases, Pr, Pa and Pb. The phase of A is differentially encoded as Pa summed with Pr while the magnitude of A is still Ma. Now, the modulated A has same magnitude and different phase. B is processed with the modified A, so that the phase is Pb+Pa+Pr and magnitude is Mb. Therefore, the phases of A and B are DPa and DPb. R is the same since it is not the data symbol. Finally, the three symbols are transmitted. Simply, the modulated symbol, Si, is represented by $$S_i = A_i e^{j(\alpha_i + \alpha_{i-1})}$$

where $\alpha_i$ and $\alpha_{i-1}$ are the phases of currently mapped point and the one of the previously modulated symbol and Ai is a magnitude of the currently mapped point.

Figure 10:
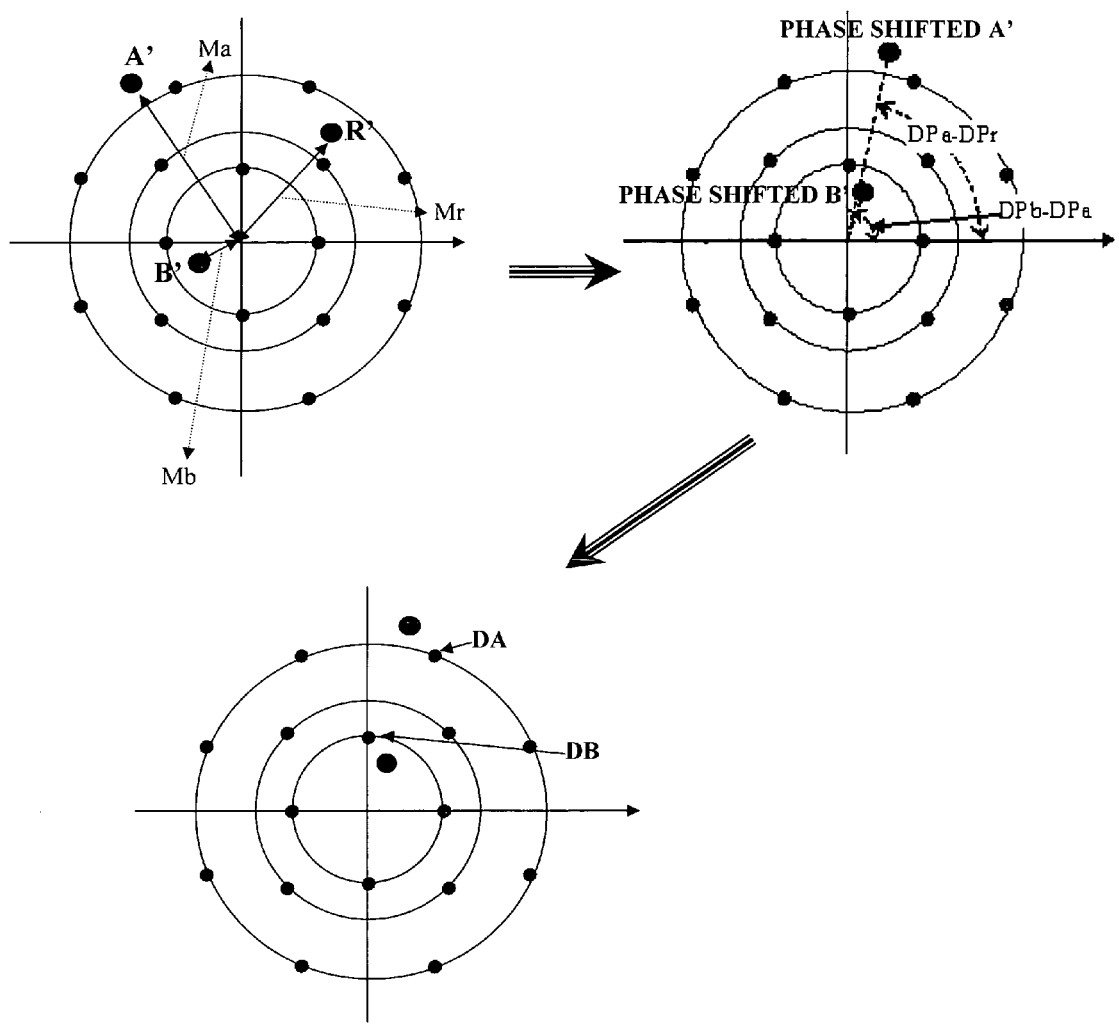
FIG. 10 illustrates the demodulation process for MLDPSK in accordance with the present invention.

FIG. 10 shows the demodulation process of the invention. The demodulation process without any noise is expressed by $$\frac{B_i e^{j(\alpha_i + \alpha_{i-1} + \beta)}}{e^{j(\alpha_{i-1} + \beta)}} = B_i e^{j\alpha_i} = r_i$$

where the numerator is the received signal, the denominator is the phase information of the previously received signal and $\beta$ is a phase noise from the channel. According to FIG. 10, the received signals are represented as R', A' and B'. From the channel estimation, the magnitudes of the received signals are estimated as Mr', Ma' and Mb'. The phase of A', DPa' is subtracted by DPr' of R' and the phase of B', DPb' is subtracted by DPa' of A'. Therefore, the phases of A' and B' are Pa' and Pb'. The receiver calculates the distances between the received symbol and all points on the constellation and considers the closest one as the transmitted symbol. In other words, each point has its own region so that if the received symbol is in one of the regions, the point falling into that region is considered as the transmitted symbol. DA and DB in FIG. 9 are finally demodulated symbols of A' and B'. This process is expressed by $$S = \underset{m \in \{1,2,\ldots,M\}}{\arg\min} \|Hr_i - S_m\|^2$$

where M is the maximum number of points in the constellation, Sm is one of the points in the constellation, H is the estimated channel gain and S is the demodulated symbol.

Therefore, expanding the region of each point on the constellation using several magnitudes of symbols, the invention decreases the probability of error and achieves the high data rate in the power line communication comparing to the conventional differential modulation.

Using an embodiment of the invention, high data rate can be achieved even in a sudden phase changed environment. For a better communication system, the arts of OFDM and BICM are used in cooperation with MLDPSK. Since OFDM uses a number of orthogonal sub-carriers, the same number of symbols as the number of sub-carriers is transmitted at the same time. Therefore, comparing to the one carrier system, a higher data rate is achieved. In addition, In a multi-carrier system like OFDM, each sub-carrier experiences different channel conditions under the frequency selective fading environment which is common in power line communication. In other words, each channel has different signal-to-noise ratio (SNR). In order to achieve certain performance, high density modulation which uses constellation with many points needs high SNR while low density one needs low SNR. For reliable communication, a different M-ary constellation is applied to each sub-carrier according to the SNR of each sub-carrier. This is called bit loading where the number of bits assigned to each sub-carrier is adaptive to the sub-carrier channel condition.

Even though bit loading is good for frequency selective fading, there is impulse noise which is not solved by bit loading. With impulse noise, the channel condition is changed abruptly so that all symbols transmitted at the same time are distorted and cause burst errors. In order to overcome this problem, BICM, which is a combination with modulation and error correction coding, is used.

Now, the process at the transmitter and receiver will be described in the system that uses MLDPSK, OFDM, BICM and bit loading.

Transmitter

Figure 11:
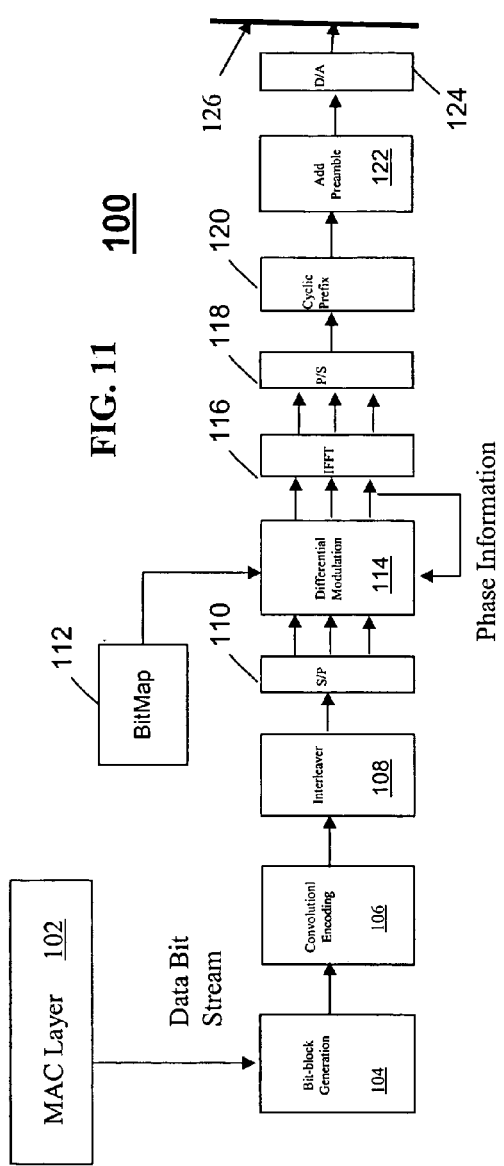
FIG. 11 is a detailed block diagram of the physical layer (PHY) at the transmitter using OFDM, MLDPSK and BICM in accordance with the present invention.

FIG. 11 shows the block diagram of a physical layer of a transmitter 100. The bit-loading is made in the state of communication set up. Before the data is transmitted, the short frame which is known at the transmitter and receiver is transmitted from the transmitter to the receiver. When the receiver receives the frame, it calculates the SNRs of all sub-carriers and decides how many bits are able to assign to each sub-carrier. The criteria for the bit allocation is provided in Table 1 below.

TABLE 1

| Modulation Type | Allocated Bits | SNR range |
| --- | --- | --- |
| DBPSK | 1 | 11 ≦ SNR < 18 |
| DQPSK | 2 | 18 ≦ SNR < 22 |
| 8-ary MLDPSK | 3 | 22 ≦ SNR < 26 |
| 16-ary MLDPSK | 4 | 26 ≦ SNR < 30 |
| 32-ary MLDPSK | 5 | 30 ≦ SNR < 34 |
| 64-ary MLDPSK | 6 | 34 ≦ SNR |

The bit allocation information for all sub-carriers is formed with a BitMap 112 which has the bit allocation list over the sub-carriers. The BitMap 112 is sent back to the transmitter as well as kept at the receiver for demodulation. With the BitMap 112, the process for the real data transmission is started when the data bit stream comes down from a Medium Access Control (MAC) layer 102.

The art of BICM consists of a convolutional encoder 106, Viterbi decoder (224), bit-interleaver/de-interleaver (108/222) and modulation/demodulation (114/212) in which MLDPSK is used. The key point of BICM is on the demodulation process which will be described later.

Figure 12A:
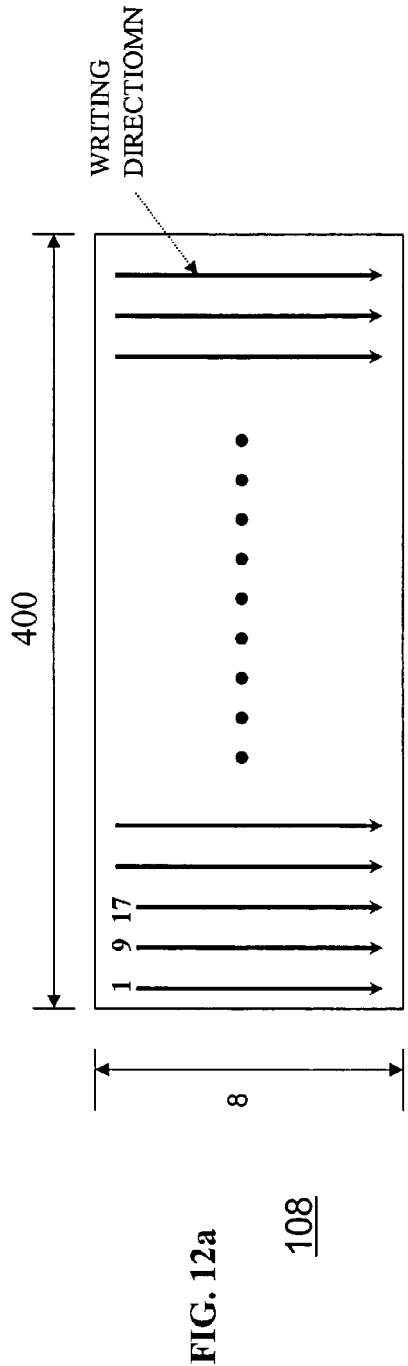
FIG. 12a illustrates the writing process in interleaver in FIG. 11.
Figure 12B:
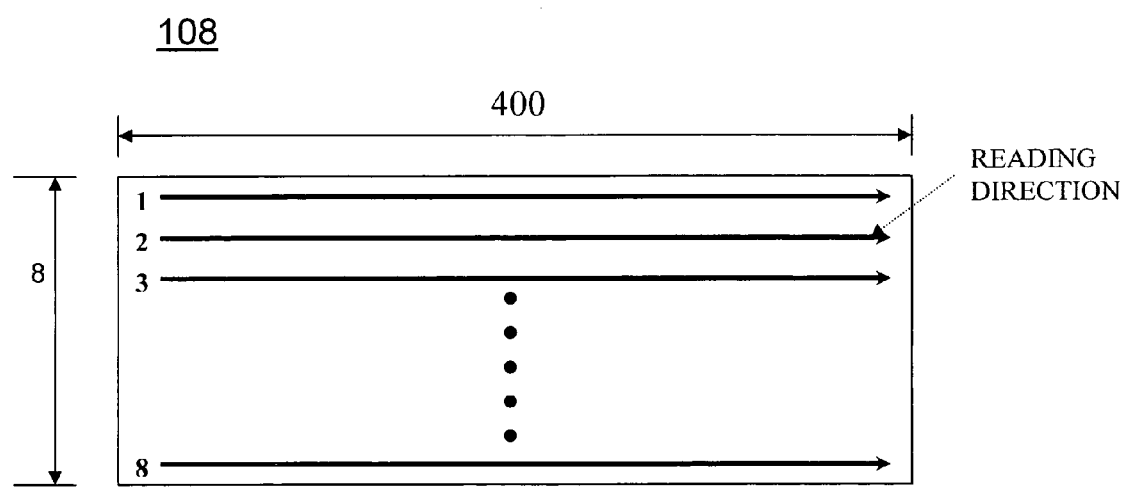
FIG. 12b illustrates the reading process in interleaver in FIG. 11.

The data bit stream from the MAC layer 102 is divided into blocks (using the bit block generator 104) for OFDM symbol and the block size is decided by the number of sub-carriers and the BitMap. The size of a bit-block is $$\left(\frac{N_{bitmap}}{N_{output}} - N_{reg} + 1\right) \times N_{input}$$

where $N_{bitmap}$ is the total number of bits in BitMap, $N_{output}$ and $N_{input}$ are the number of output and input of encoder and $N_{reg}$ is the number of registers in encoder. This one bit-block composes one OFDM symbol. This block is encoded by convolutional encoder 106, and then is interleaved using interleaver 108. FIG. 12a to 12b show the block interleaver 108 with 400 columns and 8 rows which is enough size for using 1024 IFFT size and 64 constellation size. Since the total number of bits in the interleaver 108 is varied using bit-loading, the memory size for the interleaver should be bigger than 1024×6. FIG. 12a illustrates the writing process and FIG. 12b illustrates the reading process The bit stream which is read from block interleaver is divided to the number of bits in the BitMap to form symbols, for instance, one group has 4 bits for 16-ary MLDPSK. Each divided bit block is mapped to one of the points on the constellation of the modulation specified by the BitMap. Here, one symbol block has $N_{IFFT}$ number of points. Before differential phase encoding or modulation, the symbols from the interleaver 108 are converted to phase values using the converter 110. The differential phase encoding (114) is not done with two consecutive points in the same symbol block. Using OFDM, this process is done with one point in current symbol block and one already encoded symbol in the previous symbol block and both should be for the same sub-carrier. The symbols in the first symbol-block are differentially encoded with the symbols consisting of a preamble.

Figure 13:
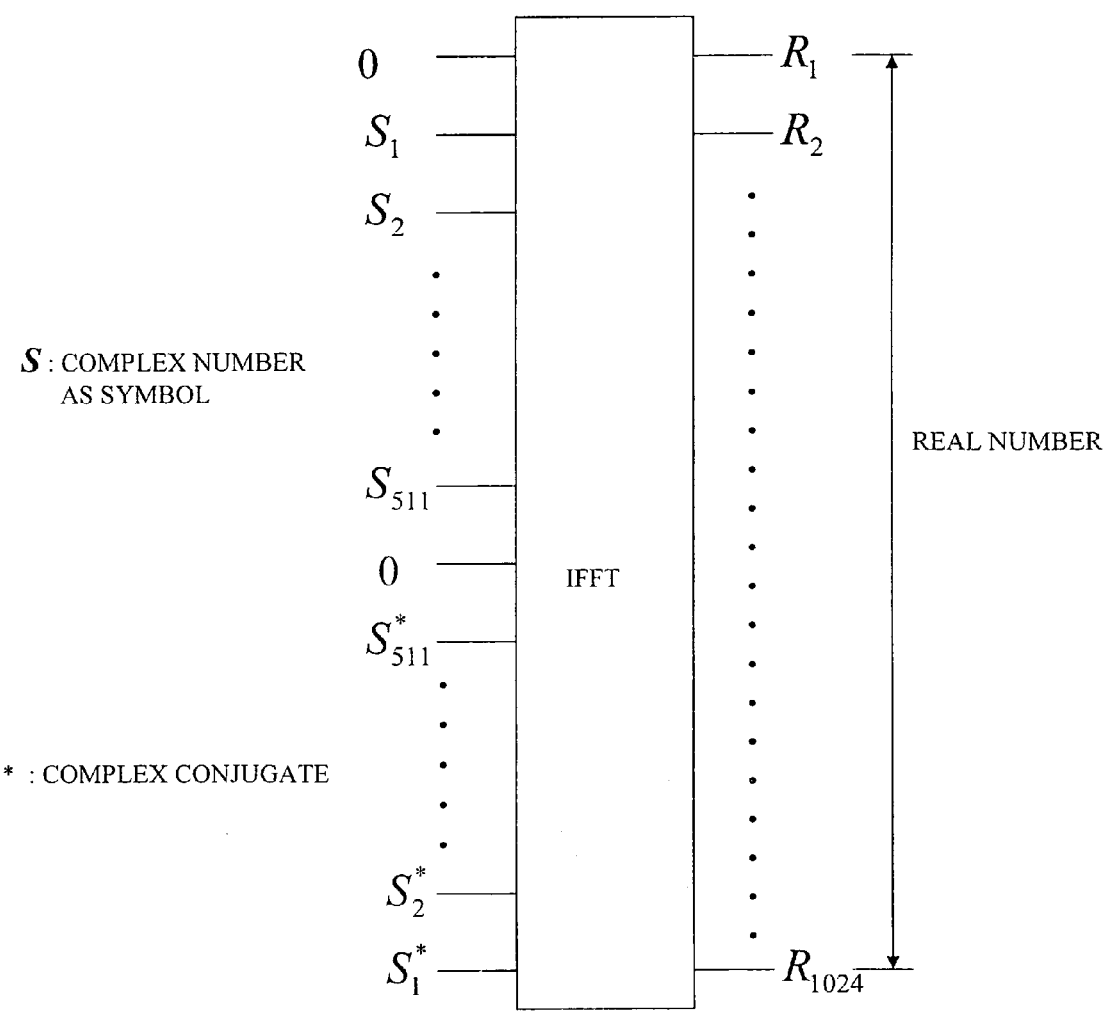
FIG. 13 shows the symbol arrangement for the input of IFFT and the results of output of IFFT in accordance with the present invention.

The number of symbols in a symbol-block is same as a half of IFFT size, $N_{IFFT}$. A symbol-block is parallelized and is inversely Fourier-transformed using IFFT at block 116, which is a main component of OFDM. The number of input ($N_{IFFT}$) is the number of sub-carriers in frequency domain and each symbol is assigned to each sub-carrier. However, two times $N_{IFFT}$ inputs come into IFFT in order to make the output be real number that is called Hermitian symmetry, but the number of input data symbol is still $N_{IFFT}$. This process for Hermitian symmetry is explained using 1024 IFFT in FIG. 13. The output of IFFT is a time domain signal which has the information of $N_{IFFT}$ data symbols (after a phase to symbol conversion using converter 118). In the final step, a last portion of the output is copied using the cyclic prefix block 120 (which prevents the original signal from Inter Symbol Interference (ISI)) and attached to the beginning of the output to form a preamble at block 122. The final output waveform is called an OFDM symbol and is transmitted through a channel 126. The output waveform can be an analog signal formed using a digital to analog converter 124.

The OFDM symbol size can be $$2 \times N_{IFFT} + N_{CP}$$

where $N_{CP}$ is size of cyclic prefix. At the final step, the preamble is attached in the beginning of OFDM symbol in order to allow a receiver (200) to synchronize and to estimate the channel. This is called a data frame. This frame is converted to an analog signal through the digital-to-analog converter 124 and then transmitted through the channel 126.

Receiver

Figure 14:
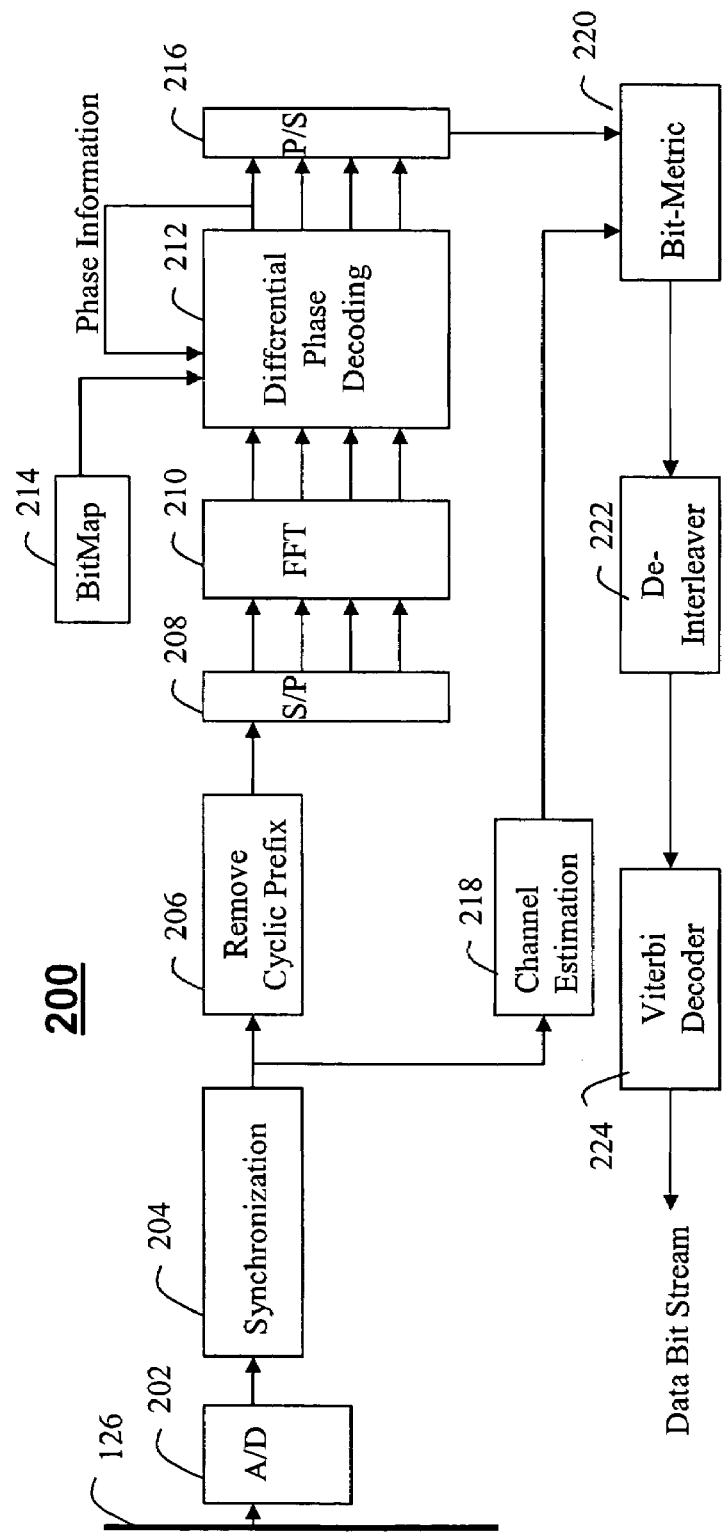
FIG. 14 is a detailed block diagram of the physical layer (PHY) at the receiver in accordance with the present invention.

FIG. 14 shows the block diagram of a physical layer (PHY) of the receiver 200 including an analog to digital converter 202 and a synchronization block 204.

When the data frame with preamble and OFDM symbols are received, the channel gains for all sub-carriers are estimated using a channel estimation block 218 using a preamble which is a known data sequence at both the receiver and the transmitter. After channel gain is obtained, the sampled signals are processed with an FFT block 210 (after removing the cyclic prefix at block 206 during a sampling period for the cyclic prefix and performing the symbol to phase conversion using converter 208). The number of sampled signal is $2 \times N_{IFFT}$.

After FFT processing at block 210, $N_{IFFT}$ of output signals out of $2 \times N_{IFFT}$ are taken and demodulated at block 212. According to the BitMap 214, each signal of each sub-carrier is demodulated with a different type of modulation. When using BICM, the minimum distance criteria between the received symbol and point in constellation to find out the actual transmitted symbol is not used in a preferred embodiment. Instead of this, the maximum log-likelihood bit metric is used at block 220 after a phase to symbol conversion at block 216. The bit metric has 2 rows and $N_{bitmap}$ columns. Bit metrics are obtained as $$\text{metric}(r_t^i = b) = -\min_{s \in \chi_b^i} \|r_t - H_t s\|$$

where $X_b^i$ is the set of points whose bit assignment has the binary value b, which is 0 or 1, at the ith bit position in the M-ary constellation, $r_1$ is the ith received symbol, and $H_1$ is the channel gain of tth sub-carrier. In other words, referring to FIG. 8a to 8b, each bit metric is calculated by selecting the constellation point with the minimum distance over the set $X_b^i$. The first row is for the case that the binary number is 0 at the ith position and the second row is for the case that the binary number is 1 at that position. Each column entry is written as the chosen minimum distance at the ith position.

This metric is deinterleaved using deinterleaver 222 and then finally decoded using the standard Viterbi algorithm or a Viterbi decoder 224.

While a number of advantageous embodiments have been chosen to illustrate the present invention, it will be understood by those skilled in the art that various changes and modifications can be made therein without departing from the scope of the invention as defined in the appended claims.

What is claimed is:

1. A constellation design for a communication system, comprising:
   a plurality of rings in a constellation, wherein each ring in the plurality of rings has a different radius that is dependent upon a total number of points in the constellation design;
   a phase difference between two consecutive points on a predetermined ring dependent upon an order of the predetermined ring;
   a predetermined number of rings dependent upon the total number of points in the constellation design; and
   a predetermined bit sequence assignment to the points in the constellation design dependent upon the total number of points in the constellation design.

2. The design according to claim 1, wherein when the total number of points is 8, the structure comprises 2 rings having a first order ring with a radius of 1 and a second order ring of a radius of 2, a phase difference between two consecutive points of 90 degrees on both the first order ring and the second order ring, and a bit order sequence of 000, 001, 011, and 010 on the first order ring and a bit order sequence of 100, 101, 111, and 110 on the second order ring.

3. The design according to claim 1, wherein when total number of points is 16, the structure comprises 3 rings having a first order ring with a radius of 1, a second order ring of a radius of 1.5, and a third order ring with a radius of 2.3, a phase difference between two consecutive points of 90 degrees on both the first order ring and the second order ring and a phase difference between two consecutive points of 45 degrees on the third order ring.

4. The design according to claim 1, wherein when total number of points is 32, the structure comprises 4 rings having a first order ring with a radius of 1, a second order ring of a radius of 1.2, a third order ring with a radius of 1.4, and a fourth order ring with a radius of 1.9, a phase difference between two consecutive points of 90 degrees on both the first order ring and the second order ring, a phase difference between two consecutive points of 45 degrees on the third order ring, and a phase difference between two consecutive points of 22.5 degrees on the fourth order ring.

5. The design according to claim 1, wherein when total number of points is 64, the structure comprises 5 rings having a first order ring with a radius of 1, a second order ring of a radius of 1.12, a third order ring with a radius of 1.47, a fourth order ring with a radius of 2.12, and a fifth order ring with a radius of 2.8, a phase difference between two consecutive points of 90 degrees on both the first order ring and the second order ring, a phase difference between two consecutive points of 22.5 degrees on the third, fourth and fifth order rings respectively.

6. The design of claim 1, wherein modulation using the design is for a semi-non-coherent system and wherein a modulated symbol has:
   a same magnitude as one of the points mapped with an incoming bit sequence; and
   a differentially encoded phase with one of the points mapped with the incoming bit sequence and with one of the points mapped with a previous modulated symbol.

7. The design according to claim 6, wherein the phase of a first data symbol is differentially encoded with a reference symbol which lacks data information but is known at both a receiver and a transmitter of the design.

8. The design of claim 7, wherein the reference symbol is a last symbol in a preamble.

9. A design according to claim 1, wherein the design is a communication system having a channel subject to a sudden phase change and wherein a modulated symbol has a phase encoded differentially with the phase of a previous modulated symbol and an absolute magnitude.

10. The design according to claim 9, wherein the communication system is a power line communication system.

11. The design of claim 1, wherein modulation using the design is for a coherent system and wherein a modulated symbol has:
   a same magnitude as one of the points mapped with incoming bit sequence; and
   a same phase with one of the points mapped with incoming bit sequence.

12. A method for demodulation in a semi-non-coherent system, the method comprising the steps of:
   estimating a magnitude for a current received symbol;
   differentially decoding a phase with a phase of a previous received symbol for a phase of the current received symbol; and
   finding a closest point to the current received symbol with the differentially decoded phase and the estimated magnitude on a predetermined constellation
   wherein the predetermined constellation has a plurality of rings and each ring in the plurality of rings has a different radius that is dependent upon a total number of points in the predetermined constellation, wherein a phase difference between two consecutive points on a predetermined ring is dependent upon an order of the predetermined ring, wherein a predetermined number of rings is dependent upon the total number of points in the predetermined constellation; and wherein a predetermined bit sequence assignment to the points in the predetermined constellation is dependent upon the total number of points in the predetermined constellation.

13. The method according to claim 12, wherein the method further comprises the step of demodulating a first data symbol with a reference symbol which is a last symbol in a preamble and is known at both a receiver and a transmitter in the system.

14. A method for demodulation a coherent system, the method comprising the steps of:
   estimating a magnitude for a current received symbol;
   estimating a phase for a current received symbol; and
   finding a closest point to the current received symbol with the estimated phase and the estimated magnitude on a predetermined constellation
   wherein the predetermined constellation has a plurality of rings and each ring in the plurality of rings has a different radius that is dependent upon a total number of points in the predetermined constellation, wherein a phase difference between two consecutive points on a predetermined ring is dependent upon an order of the predetermined ring, wherein a predetermined number of rings is dependent upon the total number of points in the predetermined constellation; and wherein a predetermined bit sequence assignment to the points in the predetermined constellation is dependent upon the total number of points in the predetermined constellation.

15. A communication system, comprising:
   a receiver having a combined orthogonal frequency division multiplexing demodulation and a bit-interleaved coding demodulation scheme;
   a transmitter having a combined orthogonal frequency division multiplexing modulation and a bit-interleaved coding modulation scheme; and a bitmap shared by the receiver and the transmitter providing a predetermined constellation of symbols wherein an amplitude and a differentially encoded phase are used to determine a closest symbol for a currently transmitted symbol wherein the predetermined constellation has a plurality of rings and each ring in the plurality of rings has a different radius that is derendent upon a total number of points in the predetermined constellation, wherein a phase difference between two consecutive roints on a predetermined ring is dependent upon an order of the predetermined ring, wherein a predetermined number of rings is dependent upon the total number of roints in the predetermined constellation; and wherein a predetermined bit sequence assignment to the points in the predetermined constellation is dependent upon the total number of points in the predetermined constellation.

16. The communication system of claim 15, wherein the bitmap comprises different number of sample points are positioned on different rings and the points on a same ring have a same phase difference, while the phases of points on two consecutive rings are different.

17. The communication system of claim 15, wherein a phase is differentially encoded with a previous encoded symbol, but an amplitude is not.

18. The communication system of claim 17, wherein a channel gain estimation is used to determine the amplitude.

* * * * *